United States Patent Office 3,378,512
Patented Apr. 16, 1968

3,378,512
TACKIFYING CEMENTS FOR EPM AND EPDM RUBBERS
Parviz Hamed, Akron, and Everett T. McDonel, Brecksville, Ohio, assignors to The B. F. Goodrich Company, New York, N.Y., a corporation of New York
No Drawing. Filed Sept. 28, 1965, Ser. No. 491,035
3 Claims. (Cl. 260—33.6)

ABSTRACT OF THE DISCLOSURE

A tackifying cement is supplied for EPDM terpolymers. The cement is formed by blending solutions of (1) EPDM polymer compounded for reinforcement and sulfur cure, (2) a polymeric cohesive agent, and (3) a combination of a tackifying resin and a polymeric softening agent.

---

This invention relates to tackifying cements for use with elastomeric materials based on ethylene-propylene copolymers and ethylene-propylene-diene terpolymers and to a method of preparation of said cements.

Any synthetic elastomer is of interest to the manufacturer of molded, extruded and cast articles made traditionally from natural rubber or any of the synthetic substitutes and alternative materials for natural rubber which have been developed in recent years. Elastomers currently receiving much attention, particularly because of their potential low cost and high resistance to weather, age, heat and ozone, are copolymers of ethylene and propylene and the terpolymers of ethylene-propylene and a straight chain or cyclic diolefinic material, the manufacture of which is disclosed in U.S. patents including 2,933,480, 3,000,866 and 3,000,867. These ethylene-propylene-diene terpolymers are currently identified as EPDM rubbers in the ASTM designation D1418–56T, and ethylene-propylene copolymers are designated as EPM rubbers. Hereafter when EPDM rubbers are referred to it is to be understood that EPM rubbers are meant as well. The major difference between the two types of materials is that the EPM rubbers are cured in a peroxide cure system. They are so completely unsaturated that a sulfur cure is not possible. EPDM rubbers, containing some unsaturation in the diene component present, do undergo sulfur cure. A major deficiency of EPM and EPDM rubbers, in the eyes of the rubber industry is their lack of tack, which makes it impossible to build shaped articles by the processes employed with natural rubber.

To become a major item in the present day synthetic rubber industry, a material must lend itself to the manufacture of shaped articles such as tubing, belts, and the major product, tires. If a new material is low enough in cost and has sufficinetly outstanding properties, the industry will make every effort to use it in spite of building tack deficiencies that make it more difficult to employ than the favorite natural rubber (NR). Other synthetic materials, including styrene-butadiene rubber (SBR), and butyl rubber (IRR) have presented this same difficulty. The SBR and IRR materials lack the green strength and tackiness of natural rubber, and tires and other shaped rubber products have been successfully made from them only when compounding techniques and new additives have been developed that impart proper building tack to them. When natural rubber techniques are followed in building a tire from the ethylene-propylene-diene terpolymers, the effort meets with failure. Styrene-butadiene rubber can be formulated into tires using either blends with natural rubber or cements of high Mooney viscosity SBR with oil-soluble blocked phenolic resins. These techniques cannot be used with EPDM terpolymers. Blends of natural rubber and EPDM rubber do not cure compatibly with conventional sulfur systems. The SBR tackifying cements, when applied to EPDM rubber stock, impart sufficient green strength for building a tire, but lack the ability to maintain adhesion at the stock interfaces when the tire is cured or vulcanized, and the tire delaminates. Butyl rubber cements, made in a manner similar to SBR cements but using butyl rubber, impart enough tack to butyl rubber to allow manufacture of butyl tires, but these cements do not help with construction of an EPDM tire because they do not tolerate the high oil levels of EPDM stocks. The prior art phenolic, terpene, and natural resin tackifiers are actually found to severely retard EPDM terpolymer cures and they also cause bloom when mixed into the bulk polymer. If one follows the teaching of the prior art and prepares similar cements of EPDM rubber and oil-soluble blocked phenolic resin, the effort of building an EPDM tire will still not be crowned with success. The strength of uncured cements films of these materials is low. When coated with one of these tackifying cements and stored in conventional cloth liners according to industry practice, sheets of EPDM terpolymer lose virtually all tack imparted by the cement in 24 hours or less.

The property of tackiness in rubber and rubberlike materials has several aspects and is difficult to evaluate on a numerical basis. The Wallace Tackmeter is one laboratory instrument that has been devised to measure tack in rubber and rubber cements. Wallace Tackmeter results reported herein are obtained using a 180 g. load and a contact time of one minute. Unfortunately, a sample exhibiting good tack sufficient for building a tire, for example, will usually register above the maximum Tackmeter reading of 1000. Tack contributes unvulcanized green strength or building strength to a rubber so that a shaped article will hold together as it is formed and carried to the vulcanizer and in vulcanization it contributes to the ability of the article to cure without losing interface adhesion at the ply surfaces. In the forming of a shaped article, the materials must have the property of "quick grab," that is, when lightly and rapidly touched together, they should immediately adhere to each other with sufficient force to support their own weight. When two pieces are lightly pressed together, held together approximately one second, then pulled apart, the degree of hand pull is a measure of tack. When two pieces are touched together, pulled apart, and touched together again, the materials must adhere firmly after the final contact. Subjective evaluations of tack of this nature are extremely valuable and accurate when performed by one skilled in the art. They are referred to as "Quick Tack," "Hand Pull" and "Repeat Tack" tests. Results are reported as poor, fair, and good with plus or minus signs appended to indicate intermediate levels. A further test that is important in evaluating rubbery stocks for use in construction of tires is the static cured adhesion test. In this test, two pieces of stock 6" x 1" x ½" are coated on one side with tackifying cement. The samples are allowed to stand until the solvent has evaporated, then the cemented sides are pressed together for 60' at 302° F. under 200 p.s.i. pressure. The cured sample is then subjected to 180°, 10" per min. pull in an Instron tensile test machine. The sample should fail in the stock, not in the cement line. Results are reported as lb./in. of width.

A method has now been discovered of formulating EPDM cement compositions, which when coated on the surfaces of EPDM stocks, provide greatly enhanced tack, adequate cured adhesion of the interfaces after vulcanization, and improved retention of tack after storage of uncured, cemented materials, of up to one week as compared to the maximum of 24 hours afforded by prior art materials. The method employs a combination of critical ingredients and the method and order of combining these ingredients is also critical.

A useful tackifying cement for EPDM materials is made up of (1) a reinforced base polymer or blend or polymers with cure rates and unsaturation levels very similar to those of the compounds to be coated, hence this is an EPDM polymer or blend of EPDM polymers, (2) a raw polymer cohesive agent to improve cement green strength and, (3) a combination of tackifying resin and softening agent polymer to impart stickiness to the cement. Elements (1), (2) and (3) must be dissolved in certain critical solvent systems and the order of mixing is important. The base polymer reinforcement, generally carbon black, but optionally silica, and any curing compounds employed, must be separately dispersed into the solid terpolymer by mill or Banbury mixing before this component (1) is dissolved in the general solvent for final mixing with components (2) and (3). From 50 to 70 parts carbon black and 2–10 parts of zinc oxide are preferably added per 100 parts base polymer. Conventional curing systems, e.g. tetramethylthiuram disulfide and sulfur; zinc dimethyl dithiocarbamate and sulfur, may also be employed.

The required cohesive agent, which improves the green strength of the cement, is selected from raw or uncompounded polymers that possess the property of maintaining an unvulcanized breaking stress higher than the yield stress and include polychloroprene, butyl rubber (isoprene-isobutylene copolymer of about 60–80 Mooney viscosity, ML 8' at 212° F.), halogenated butyl rubbers (60–80 Mooney viscosity, ML 8' at 212° F.), chlorosulfonated polyethylene (Cl=27%–36.5%, S=0.8%–1.6%), chlorinated polyethylene (Cl=25%–36%) and polyisobutylene, mol. wt. 100,000–200,000. These are all commercial polymers, available in the market. The amount of cohesive agent that can be used must be held from 5 to 25 parts per 100 parts of base polymer (1) because excessive amounts of raw polymer cohesive agent severely limit cured adhesion.

The softening agent, which imparts stickiness to the cement film and contributes tack retention, is low molecular weight poly-alpha-olefin containing 3–6 carbon atoms such as polybutene-1 (mol. wt. 1000–5000) and amorphous polypropylene (mol. wt. 10,000–60,000). Adhesive strength is imparted to the cement by tackifying resins, exemplified by the oil-soluble, alkyl-substituted phenolformaldehyde resins, acetylene-alkyl-substituted phenol condensation product resins, and terpene resins. These resins preferably have a melting point range of 50°–240° F., are oil-soluble and may be non-heat reactive or heat reactive. The term oil-soluble is intended to include those resins formed by the reaction of certain substituted phenols with formaldehyde. These particular substituted phenols have at least one of their reactive sites blocked by an oil-soluble alkyl group, generally containing 1–20 carbon atoms. A preferred group is t-butyl ($C_4H_9$—). Another preferred group is the nonyl radical ($C_9H_{19}$—). The oil-soluble resin products of the reaction of substituted phenols and formaldehyde are further classified as non-heat reactive and heat reactive depending upon the ratio of the reacting materials. When substituted phenol and formaldehyde are reacted in nearly equivalent molar ratios, an oil-soluble, non-heat reactive resin is produced. When a large excess of formaldehyde is used in preparing the resin, many methylol ($CH_2OH$—) groups are present in the resin. These groups are quite reactive and need only the presence of heat to induce them to give up water and form a cross link bond. Resins of this type are oil-soluble, heat reactive. Either type, heat reactive or non-heat reactive, may be used as the tackifying resin in this invention. From 20–100 parts of softening agent are used per 100 parts base polymer. From 10 to 40 parts of tackifying resin are used per 100 parts base polymer. It is to be understood that in the practice of this invention, blends of EPDM polymers may be used as the base polymer, blends of cohesive agents may be used, and blends of tackifying resins and softening polymers may be used.

The (1) reinforced base polymer, (2) cohesive agent and (3) softening agent and tackifying resin are separately dissolved in a solvent selected from the class consisting of aliphatic hydrocarbon and chlorinated aliphatic hydrocarbon solvents. Representative solvents include hexane, naphtha, 1,1,1-trichloroethane, 1,1,2-trichloroethylene, carbon tetrachloride, and the like. Mixtures of these solvents may also be used. The exclusive use of aromatic solvents has been found to produce cements with less tack. The final blend is stirred until it is a smooth cement and is diluted to a consistency of 5% to 20% total solids.

A tackifying cement containing the elements described above and prepared in the manner described above can be applied to layers or sheets of EPDM terpolymer and will serve to tackify the rubbery polymer sufficiently that shaped articles such as belts and tires can be formed, and cured. After cure the articles show no evidence of delamination at interfaces of the ply layers.

A limitation on the tack qualities of this cement is the fact that, once tackified and stored in conventional cloth liners, the terpolymer stocks must be used in one week or less or they have lost such a great degree of their tackiness that the building qualities deteriorate and the shaped articles cannot be assembled.

It has now been discovered that the tackifying cement of (1) reinforced EPDM terpolymer, (2) raw polymer cohesive agent, and (3) a softening agent and tackifying resin separately dissolved in an aliphatic hydrocarbon solvent, then solvent blended and diluted to 5%–20% total solids, can be improved to have and to impart to EPDM stocks tack sufficient for building operations that will be satisfactorily retained, when the stock sheets are stored in cloth liners, for periods up to two weeks.

This development is accomplished by blending 10 to 50 parts of low molecular weight EPDM terpolymer characterized by having 55–65 mol. percent ethylene, 1–3 mol. percent diene, and dilute solution viscosity (DSV) measured by dissolving 0.2 g. in 100 ml. of toluene at 25° C. in the range 0.4–0.9 with 90 to 50 parts commercial high molecular weight EPDM terpolymer characterized by having 50–70 mol. percent ethylene, 1–3 mol. percent diene, Mooney viscosity 70–130 (4' at 212° F.) and DSV of 1.5–3.0. This blend is used as the base polymer for the tackifying cement. The low molecular weight EPDM polymers employed in the practice of this invention can be made by direct polymerization of ethylene, propylene, and a diene monomer using conventional solution polymerization techniques with vanadium salts and aluminum alkyls as catalysts as described in the patents mentioned above and hydrogen modification to lower the molecular weight, or by depolymerizing high molecular weight EPDM polymers which are commercially available. The depolymerization is accomplished by heating the EPDM polymer at 125° C.–250° C. for 2 to 8 hours in a solvent preferably selected from the class consisting of chlorinated hydrocarbons, such as perchloroethylene, carbon tetrachloride and tetrachloroethylene in combination with an organic peroxide such as t-butyl peroxide, dicumyl peroxide and dibenzoyl peroxide, nitroaromatics, such as nitrobenzene and nitrotoluene, plus, optionally, metallic copper, manganese or cobalt, or acids such as nitric acid and sulfuric acid. Ultraviolet light will further catalyze depolymerization in an organic solvent. The solvent is removed by steam distillation or water extraction and the depolymerized low molecular weight EPDM is then washed and dried.

Tackifying cements made according to this invention are useful to coat carcass stocks for building EPDM tires and other bulky articles and for holding EPDM tread splices together. Without cements of this nature, tires cannot be built on present commercial tire building machines.

The following examples will serve to illustrate this invention. Unless otherwise stated, parts are parts by weight.

Examples I–III

A commercial EPDM terpolymer, 65 mol. percent ethylene, 1.5 mol. percent diene, DSV 2.3, is mill blended with carbon black reinforcement, and miscellaneous curatives, then dissolved in a mixed solvent of 50 parts hexane/50 parts trichloroethylene.

A cohesive agent, a raw copolymer of isopreneisobutylene, 71–89 Mooney viscosity, 1.5–2.0 mol. percent unsaturation, is separately dissolved in a portion of the said solvent.

In Example I a tackifying resin, the polycondensation product of p-tert.-butyl phenol and acetylene, is separately dissolved in the said solvent.

In Example II a softening agent, poly-1-butene (mol. wt. 1000–2500), is combined with the above tackifying resin and both materials are dissolved in the said solvent.

In Example III a large amount of cohesive agent is used to see if this will contribute to improved strength.

The three solutions for each example are then mixed thoroughly and the overall solution is diluted to 10% total solids.

The cements are coated on 0.075″ thick sheets of raw EPDM terpolymer and tested for tack by Hand Pull and Wallace Tackmeter tests while they are fresh, and after aging 24 hours wrapped in cloth liners at room temperature, and after aging 2 weeks in cloth liners at room temperature.

Recipe and data are set forth below:

| | Example | | |
|---|---|---|---|
| | I | II | III |
| Material, parts: | | | |
| EPDM (Base polymer) | 100 | 100 | 100. |
| Carbon black | 50 | 50 | 50. |
| Zinc oxide | 5 | 5 | 5. |
| Paraffinic processing oil | 5 | 5 | 5. |
| Tetramethylthiuram disulfide | 1.0 | 1.0 | 1.0. |
| Benzothiazyl disulfide | 0.5 | 0.5 | 0.5. |
| Sulfur | 1.25 | 1.25 | 1.25. |
| Cohesive agent | 10 | 10 | 50. |
| Tackifying agent | 30 | 30 | 25. |
| Softening agent | | 50 | 20. |
| Tack test results: | | | |
| Hand Pull test: | | | |
| Fresh | Good | Good+ | Good. |
| After 24 hours aging | Fair− | Fair+ | Do. |
| After 2 weeks aging | Poor | Fair− | Do. |
| Wallace Tackmeter | All values are 1,000+ beyond the range of the instrument, hence, good. | | |
| Static cured adhesion, lb./in.: | | | |
| Fresh | 153s* | 153s | 105c. |
| Aged 3 days at 212° F., pulled at 212° F. | 90s | 90s | 45c. |

*s=failure in stock; c=failure in the cement.

Example I is illustrative of a tackifying cement prepared using EPDM polymer and the solvent mixing technique of this invention.

Example II is the same as Example I, but incorporates a softening agent to impart stickiness to the cement. The II cement is an improvement over the I cement, btu its tack retention properties on storage are too poor for it to be used in all commercial operations.

Example III, with a large amount of cohesive agent, has fine hand pull properties, but fails in cured adhesion.

Examples IV–V

Low molecular weight terpolymer of ethylene, propylene and dicyclopentadiene is prepared in 2 liter reactor using vanadium and aluminum alkyl catalyst. Hydrogen is fed to reactor to control mol. wt. The rubber is recovered by steam coagulation. DSV ranges from 0.25–0.78, $I_2$ No. 6.9–18 and percent ethylene 62–70%.

Blends of this low molecular weight EPDM, the high molecular weight EPDM of Example I, carbon black, and curative are prepared on the mill and dissolved in an aliphatic hydrocarbon/substituted aliphatic hydrocarbon solvent mixture. A cohesive agent, the raw butyl rubber described in Example I, is separately dissolved in the solvent. The tackifying resin and softening agent combination of Example I is also dissolved in a portion of the solvent. The three solutions are blended and diluted to 10% total solids. The resultant cements are coated on high molecular weight EPDM carcass stock and tested for fresh tack, aged tack after 1 week storage at room temperature in cloth liners, and static cured adhesion, the latter both at room temperature fresh and at 212° F. after 3 days aging at 212° F. Data are set forth below.

| | IV | V |
|---|---|---|
| Material, parts: | | |
| EPDM (Base polymer) | 50 | 75. |
| Low mol. wt. EPDM (0.4 DSV) | 50 | 25. |
| Carbon black | 60 | 63. |
| Zinc oxide | 5 | 7.5. |
| Paraffinic process oil | 5 | 7.5. |
| Petroleum hydrocarbon resin (polymers of aliphatic olefins) | | 2.0. |
| Tetramethylthiuram disulfide | 1.5 | 1.5. |
| N-methyl-N-4-dinitrosoaniline | | 0.5. |
| Benzothiazyl disulfide | 0.75 | 0.75. |
| Sulfur | 1.5 | 1.5. |
| Solvent | 50 hexane/50 1,1,1-trichloroethane. | 50 hexane/50 trichloroethylene. |
| Cohesive Agent | 10 | 10. |
| Tackifying Agent | 30 | 30. |
| Softening Agent | 20 | 20. |
| Hand Pull: | | |
| Fresh Tack | Very good | Very good. |
| Aged Tack (2 weeks in liner) | Good | Good. |
| Static Adhesion, lb. per in.: | | |
| At room temp | 153s | 153s. |
| Aged 3 days at 212° F. pulled at 212° F. | 85s | 80s. |

The tackifying cements of Examples IV and V, made according to the principles of this invention impart good green strength and tack which is retained up to a week in storage, to EPDM stocks. These cements also impart good cured adhesion to these same stocks.

Examples VI–VII

A commercial EPM copolymer, 50 mol. percent ethylene, 50 mol. percent propylene, DSV 2.0, Mooney viscosity 50, is mill blended with reinforcing and curing pigments in Example VI and with these pigments plus low molecular weight EPDM terpolymer from Example IV in Example VII. The compounded polymers are dissolved in trichloroethylene.

The raw polymer cohesive agent of Example I is dissolved in trichloroethylene.

The tackifying resin and softening agent combination of Example I is dissolved in trichloroethylene.

The solutions of (1) reinforced polymer, (2) cohesive agent, and (3) tackifying resin and softening agent are blended and diluted to 10% total solids.

The cements are coated on sheets of EPDM stock and evaluated in the Hand Pull and Static Cured Adhesion Tests.

| | Example | |
|---|---|---|
| | VI | VII |
| Material, Parts: | | |
| EPM copolymer | 100 | 70. |
| EPDM terpolymer (low mol. wt.) | | 30. |
| Carbon black | 60 | 60. |
| Zinc Oxide | 5 | 5. |
| Naphthenic process oil | 5 | 5. |
| Dicumyl peroxide | 3 | 3. |
| Sulfur | 0.3 | 0.3. |
| N-methyl-N, 4-dinitrosoaniline | | 0.4. |
| Cohesive Agent | 10 | 10. |
| Tackifying resin | 30 | 30. |
| Softening agent | 50 | 30. |
| Test Results: | | |
| Hand Pull: | | |
| Fresh | Very good | Very good. |
| Aged 2 weeks in liners at room temp. | Good | Very good. |
| Static Cured Adhesion, lbs. per in.: | | |
| Room temp | 155 s | 153 s. |
| Aged 3 days at 212° F. Pulled at 212° F. | 101 s | 97 s. |

The invention makes possible the preparation of a tackifying cement which can be applied to EPM copolymer rubbers to provide building tack for construction of belts and other items. Peroxide cured EPM is not yet used in tires. The storage retention of tack of these materials is excellent.

We claim:

1. A method of preparing tackifying cements for ethylene-propylene copolymer and ethylene-propylene-diene terpolymer elastomers comprising separately dissolving (1) 100 parts of a blend comprising 10 to 50 parts of EPDM terpolymer characterized by having 55–65 mol percent ethylene, 1–3 mol percent diene and DSV 0.4–0.9 and 90 to 50 parts EPDM terpolymer characterized by having 50–70 mol percent ethylene, 1–3 mol percent diene and DSV 1.5–3.0, said terpolymer blend being reinforced with 50–70 parts of reinforcing pigment selected from the class consisting of carbon black and silica, and compounded with pigments for conventional sulfur cure, (2) 5–25 phr. of a raw polymer cohesive agent having the property of maintaining an unvulcanized breaking stress higher than the yield stress, (3) a combined tackifying resin and softening agent, said tackifying resin being present in an amount from 10–40 phr. and selected from the class consisting of oil-soluble, alkyl-substituted phenol-formaldehyde resins, acetylene-alkyl-substituted phenol condensation product resins and terpene resins, said softening agent being present in an amount from 20–100 phr. and selected from the class consisting of low molecular weight poly-alpha-olefins containing 3–6 carbon atoms, in a solvent selected from the class consisting of aliphatic hydrocarbon solvents and chlorinated aliphatic hydrocarbon solvents, blending said separate solutions into one solution and diluting said solution to 5% to 20% total solids.

2. A tackifying cement for ethylene-propylene copolymer and ethylene-propylene-diene terpolymers comprising a blend of solutions of (1) 100 parts of a blend comprising 10 to 50 parts of EPDM terpolymer characterized by having 55–65 mol percent ethylene, 1–3 mol percent diene and DSV 0.4–0.9 and 90 to 50 parts EPDM terpolymer characterized by having 50–70 mol percent ethylene, 1–3 mol percent diene and DSV 1.5–3.0, said terpolymer blend being reinforced with 50–70 parts of reinforcing pigment selected from the class consisting of carbon black and silica and compounded with pigments for conventional sulfur cure, (2) 5–25 phr. of a raw polymer cohesive agent having the property of maintaining an unvulcanized breaking stress higher than the yield stress, and (3) a combined tackifying resin and softening agent, said tackifying resin being present in an amount from 10–40 phr. and selected from the class consisting of oil-soluble, alkyl-substituted phenol-formaldehyde resins, acetylene-alkyl-substituted phenol condensation product resins and terpene resins, said softening agent being present in an amount from 20–100 phr. and selected from the class consisting of low molecular weight poly-alpha-olefins containing 3–6 carbon atoms, said blend of solutions being diluted to 10% total solids, said solutions being prepared in a solvent selected from the class consisting of aliphatic hydrocarbon solvents and chlorinated aliphatic hydrocarbon solvents.

3. A tackifying cement for ethylene-propylene copolymers and ethylene-propylene-diene terpolymers comprising a blend of solutions of (1) 100 parts of a blend comprising 10 to 50 parts of EPDM terpolymer characterized by having 55–65 mol percent ethylene, 1–3 mol percent diene and DSV 0.4–0.9 and 90 to 50 parts EPDM terpolymer characterized by having 50–70 mol percent ethylene, 1–3 mol percent diene and DSV 1.5–3.0, said terpolymer blend being reinforced with 50–70 parts of reinforcing pigment selected from the class consisting of carbon black and silica, and compounded with pigments for conventional sulfur cure, (2) 5–25 phr. of a raw polymer cohesive agent, said raw polymer being selected from the class consisting of polychloroprene, butyl rubber, halogenated butyl rubber, chlorosulfonated polyethylene, chlorinated polyethylene and polyisobutylene, (3) a combined tackifying resin and softening agent, said tackifying resin being present in an amount from 10–40 phr. and selected from the class consisting of oil-soluble, alkyl-substituted phenol-formaldehyde resins, alkyl-substituted phenol-acetylene condensation product resins and terpene resins, said softening agent being present in an amount from 20–100 phr. and being selected from the class consisting of low molecular weight poly-alpha-olefins containing 3–6 carbon atoms, said solution being prepared in a solvent selected from the class consisting of aliphatic hydrocarbon solvents and chlorinated aliphatic hydrocarbon solvents.

References Cited

UNITED STATES PATENTS

| | | | |
|---|---|---|---|
| 3,086,951 | 4/1963 | Wile | 260—33.6 |
| 3,255,274 | 6/1966 | Yorcik et al. | 260—846 |

ALLAN LIEBERMAN, *Primary Examiner.*